United States Patent [19]
Halpin et al.

[11] Patent Number: 5,205,241
[45] Date of Patent: Apr. 27, 1993

[54] LIVESTOCK HAY STORAGE/FEEDER

[76] Inventors: Sharon K. Halpin; Daniel O. Halpin, both of 1800 McCarty's Landing, Dowling, Mich. 49050

[21] Appl. No.: 822,727
[22] Filed: Jan. 21, 1992
[51] Int. Cl.⁵ .................................. B60Q 5/00
[52] U.S. Cl. ............................................ 119/60
[58] Field of Search ............................ 119/58, 60

[56] References Cited

U.S. PATENT DOCUMENTS

| | | | |
|---|---|---|---|
| 1,433,777 | 10/1922 | Brown | 119/60 |
| 2,500,889 | 3/1950 | Winkler | 119/58 |
| 3,885,524 | 5/1975 | Gregory | 119/58 X |
| 4,930,449 | 6/1990 | Harton | 119/60 |

FOREIGN PATENT DOCUMENTS 1602111 11/1981 United Kingdom .................. 119/60

*Primary Examiner*—John J. Wilson
*Assistant Examiner*—Thomas Price

[57] ABSTRACT

The invention is a livestock hay feeder/storage device and involves the principle of utilizing a covered feeding device that can also serve as storage space for hay. It consists of a box-like steel structure that may be mounted on skids or wheels for mobility. The ends and top are covered for weather protection and the other two sides consist of removable/adjustable gates through which the animals can eat. These gates can be adjusted to control, or ration, consumption of the hay. The adjustable gates can be easily removed to allow filling the structure without heavy equipment. Each side of the "box" is constructed as a separate part so the device can be easily disassembled into its component sections for storage when not is use. No special tools or equipment are required by the operator to load or disassemble the device. Various materials of construction may be used to fabricate this device. This invention was designed utilizing general technical knowledge of construction and requires no special construction techniques or materials. No disclosure Document was filed.

9 Claims, 6 Drawing Sheets

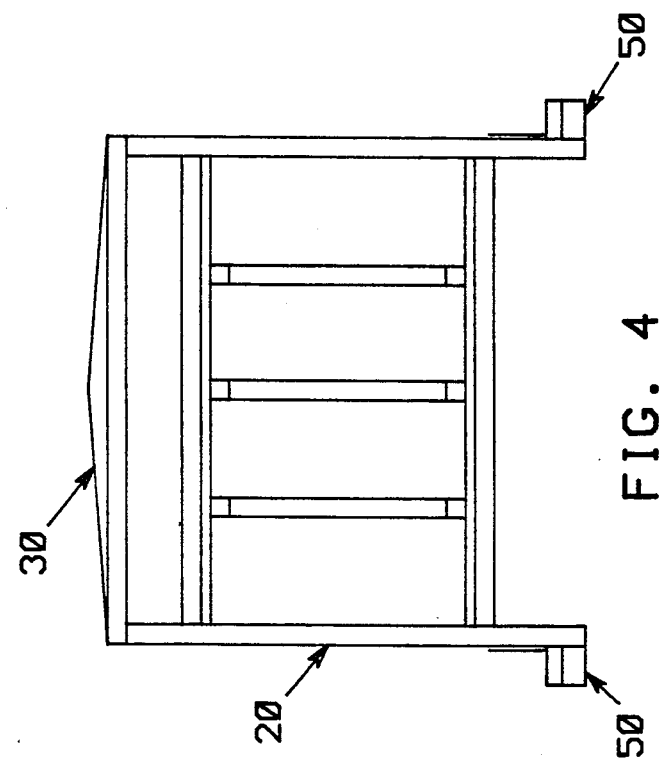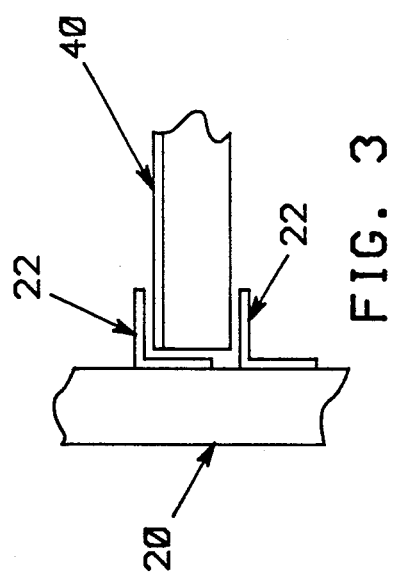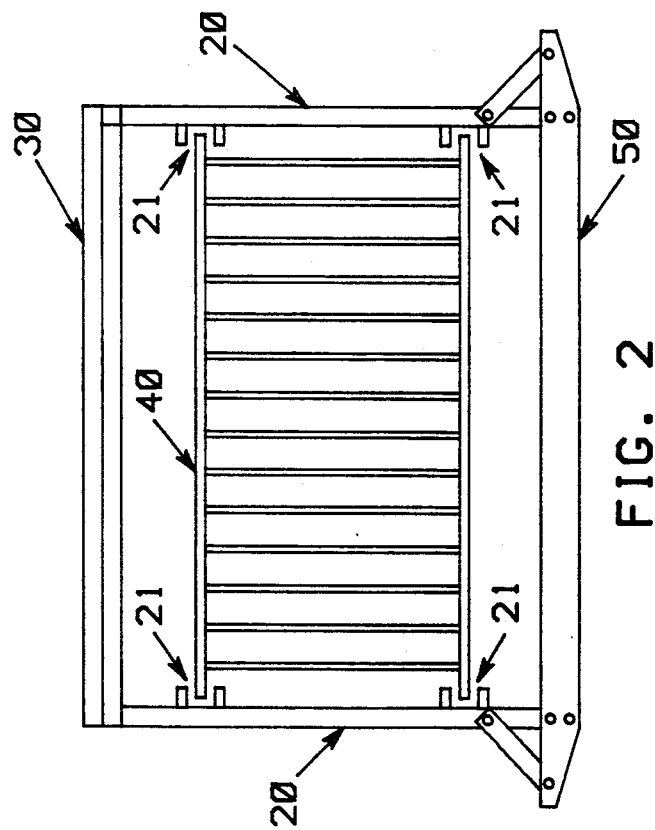

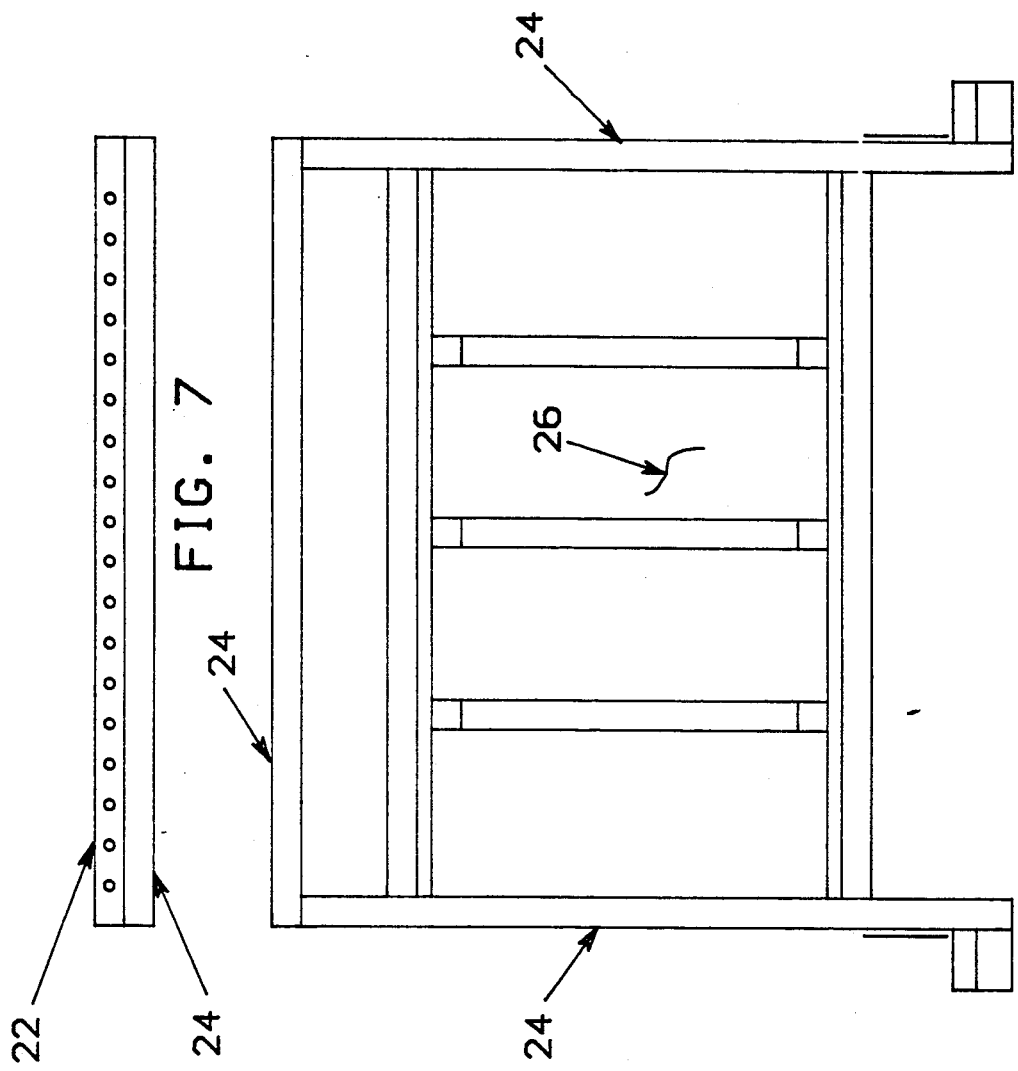
FIG. 7
FIG. 5
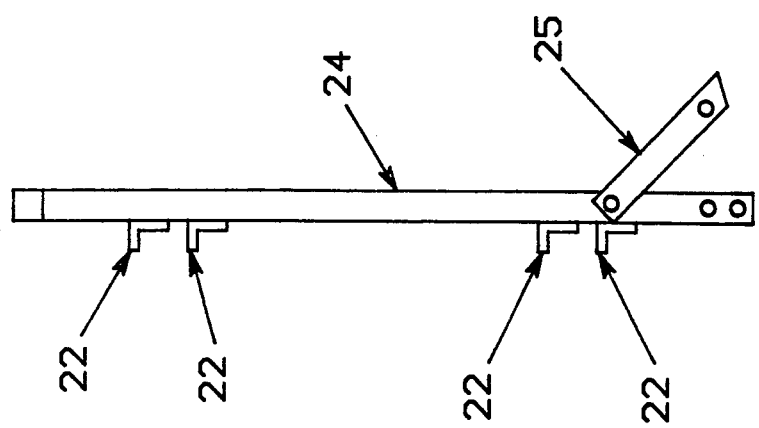
FIG. 6

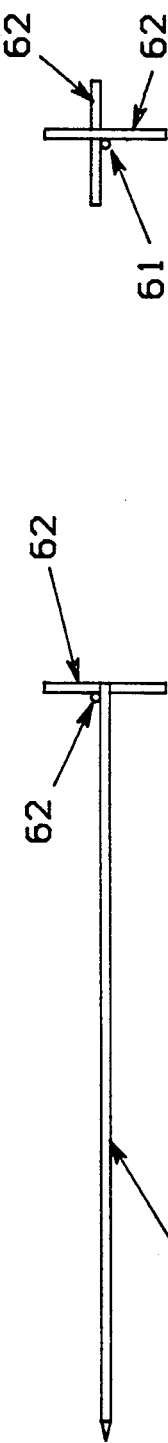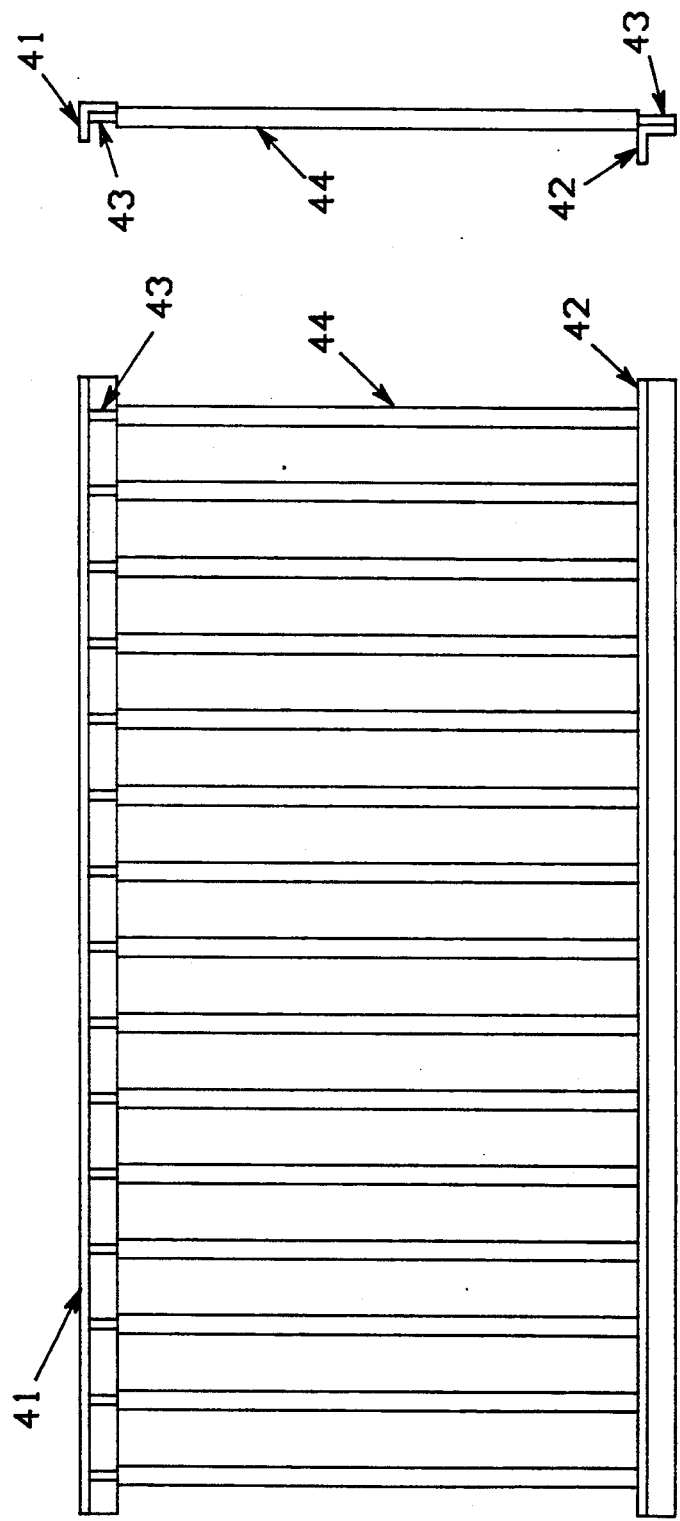

LIVESTOCK HAY STORAGE/FEEDER

BACKGROUND OF THE INVENTION

1. Field of the Invention

This invention is a unique device for storing and feeding hay to livestock. There are many types of livestock hay feeders available today. These include bunks, troughs, "V" shaped, and round and are patented in classification 119.

2. Description of Prior Art

The following patents were considered in this field:
U.S. Pat. No. 4,930,449, Harton, Jun. 6, 1990.
U.S. Pat. No. 3,885,524, Gregory, May 5, 1975.
U.S. Pat. No. 2,500,889, Winkler, Mar. 3, 1950.
U.S. Pat. No. 1,433,777, Brown, Oct. 10, 1922.
Great Britain, 1,602,111, Gouch, Nov. 11, 1991.
The problems with existing inventions vary from device to device but in general they include one or more of the following:

1. There is no method of rationing hay from the feeder. The devices are constructed and operate in such a manner that they hay is continually within reach of the livestock and therefore the animals can eat as much as they want until the feeder is empty (which can result in overeating and waste).

2. Existing methods of operation and construction limit the amount of weather protection to only a roof. It is desirable in a storage structure to enclose the area as much as possible.

3. Because it is necessary to lift the hay to get it into the feeder, heavy equipment is required for large round bales or it is necessary for the operator to lift smaller bales of hay over the top of the devices.

4. There is an inability to simply assemble the feeder after shipping or to disassemble it when not in use. Many contain complex mechanisms which are required to make the feeder work. These mechanisms complicate assembly and disassembly of the devices.

5. Some feeders may not be easily mounted on skids or wheels for portability.

6. Some feeders are designed only for square bales or only for round bales.

SUMMARY

The invention described herein, referred to as the livestock hay storage/feeder eliminates, in a single unit, all the problems mentioned above and is meant to appeal to the small to medium sized farmer. This invention not only provides a portable, partially enclosed structure for storage of quantities of hay, but also provides a means for feeding the hay directly from the storage structure. The invention also contains a means by which the operator can control the amount of hay available to the animals at any given time.

The invention consists of a box-like structure, the size of which may vary depending on the amount of storage space required. The structure is comprised of two opposing end walls joined together at the top by framing members and supporting a roof. The bottoms of these end walls are joined together with a framing member or skid. These end walls are built in such a manner that they may be covered with a suitable weatherproofing material to further prevent weather damage to the contents. These parts form the overall structure and are fastened together in a manner that facilitates easy disassembly. The bottom may be open to the ground. At least one, and usually both, of the remaining sides consist of removable, adjustable gates made of vertical bars through which the animals feed. These gates extend from end wall to opposing end wall and are supported by, and slide in, channels built into the end walls of the structure. Their position may be fixed at various distances across the width of the structure to control the amount of hay reachable by the animals.

By removing one of these gates (by sliding it out the end of the channel) the operator can open up one entire side of the structure. This allows him (or her) to then easily fill the structure with hay at the ground level thereby eliminating any lifting and/or the need for heavy equipment since he can merely carry the hay directly into the structure, or in the case of large round bales, simply roll the bale into the structure. The gates can then be adjusted inward in gradual increments by use of a locking device built into the channels, thereby limiting accessibility of the hay to the animals and thus allowing the operator to ration the hay contained in the feeder. Since, with this device, the animals will force their mouths through the gates into the feeder as far as possible to reach for the hay, it is desirable to provide a means of reducing or preventing scraping of the animals muzzles on the vertical bars in the gate (to prevent muzzle soreness and chaffing). This can be accomplished by enclosing the vertical bars in the gates in a sleeve or loose piece of pipe that is free to rotate around the bar.

The entire assembly is built in such a manner that it may be mounted on wood skids or wheels which allow it to be moved readily from place to place. Since the main components of the feeder can be fastened together with bolts and pins, and since there are no complex mechanisms necessary to make the feeder work, this invention can be easily disassembled into its component parts for storage when not in use.

This invention can be constructed in varying sizes and materials to facilitate individual needs.

BRIEF DESCRIPTION OF THE DRAWINGS

The drawings of the preferred embodiment described herein are on six sheets.

Sheet #1 contains.

Sheet #2 contains:

FIG. 2—side view of the invention showing the removable, adjustable gate and framework.

FIG. 3—detail of the channels which support the removable, adjustable gates.

FIG. 4—end view of the invention showing the surface of the end wall and the roof line.

Sheet #3 contains:

FIG. 5—outside surface view of end wall.

FIG. 6—side view of end wall showing bracing members, bolt hole locations, and channel construction.

FIG. 7—top view of end wall showing the holes in the channels in which pins are inserted to lock the gates in position thereby controlling the spacing of the gates.

Figures 8, 10:
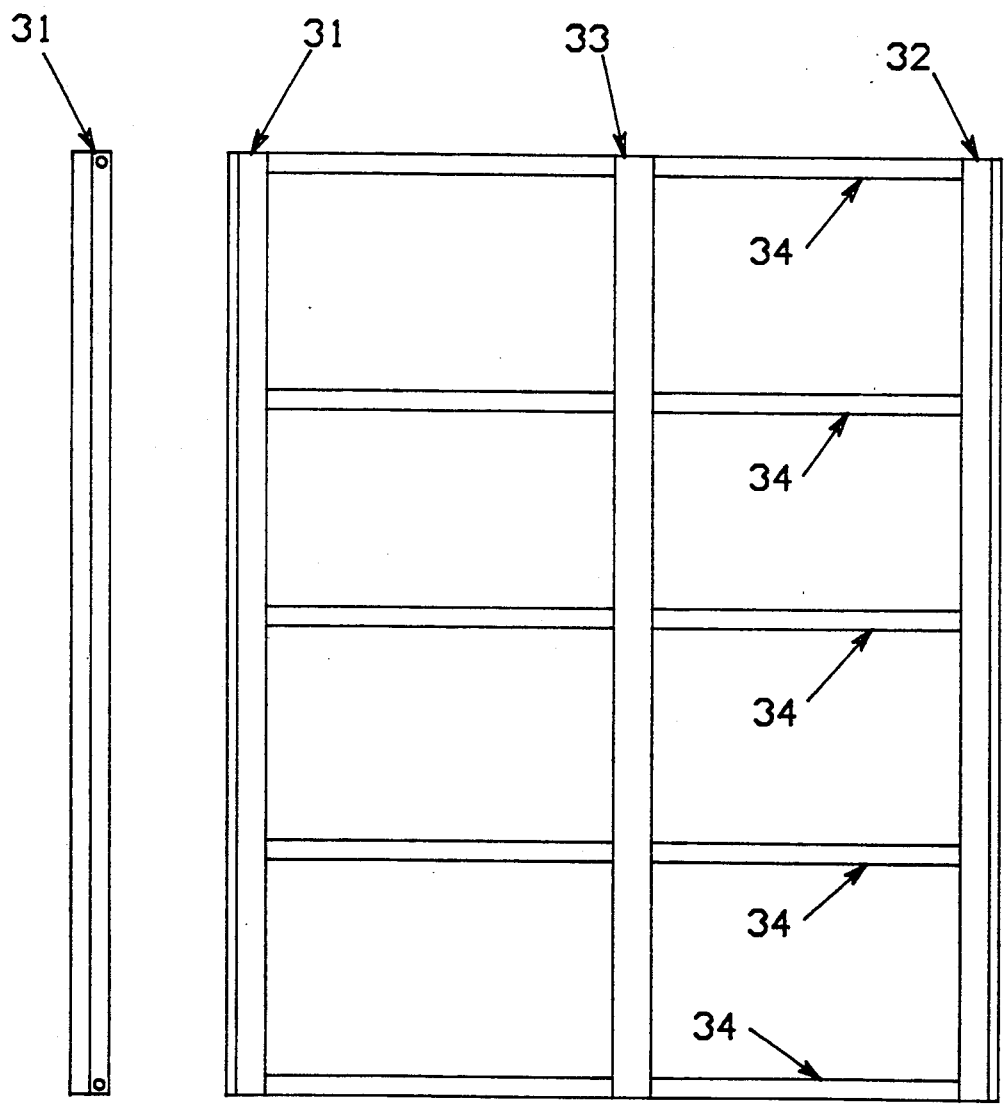

Sheet #4 contains:

FIG. 8—bottom view of roof section.

Figure 9:
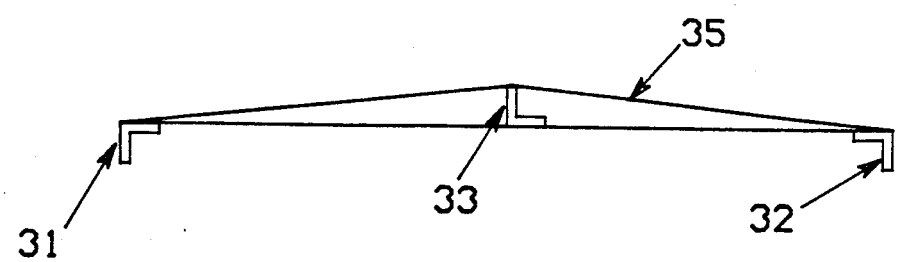

FIG. 9—end view of roof.

FIG. 10—side view of roof.

Sheet #5 contains:

FIG. 11—front view of adjustable, removable gate.

FIG. 12—end view of adjustable, removable gate showing the soreness prevention sleeve on the vertical gate rods.

FIG. 13—side view of an optional hay holder rod.

FIG. 14—end view of an optional hay holder rod.

Figure 15:
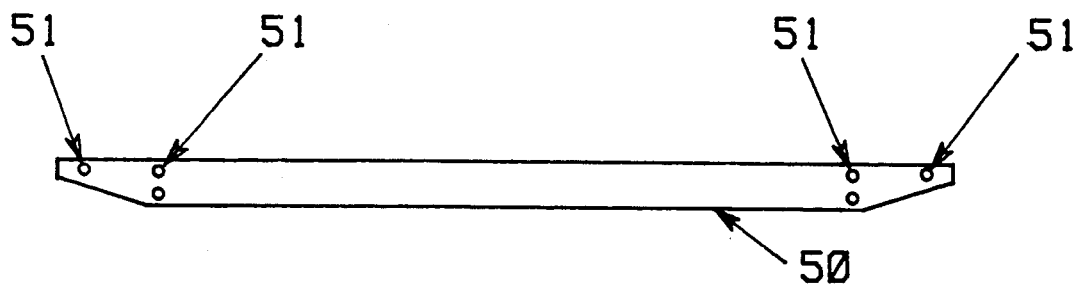

Sheet #6 contains:

FIG. 15—a side view of one of the skids and indicates mounting holes for the bases of the end walls.

DESCRIPTION OF THE PREFERRED EMBODIMENT

Figure 1:
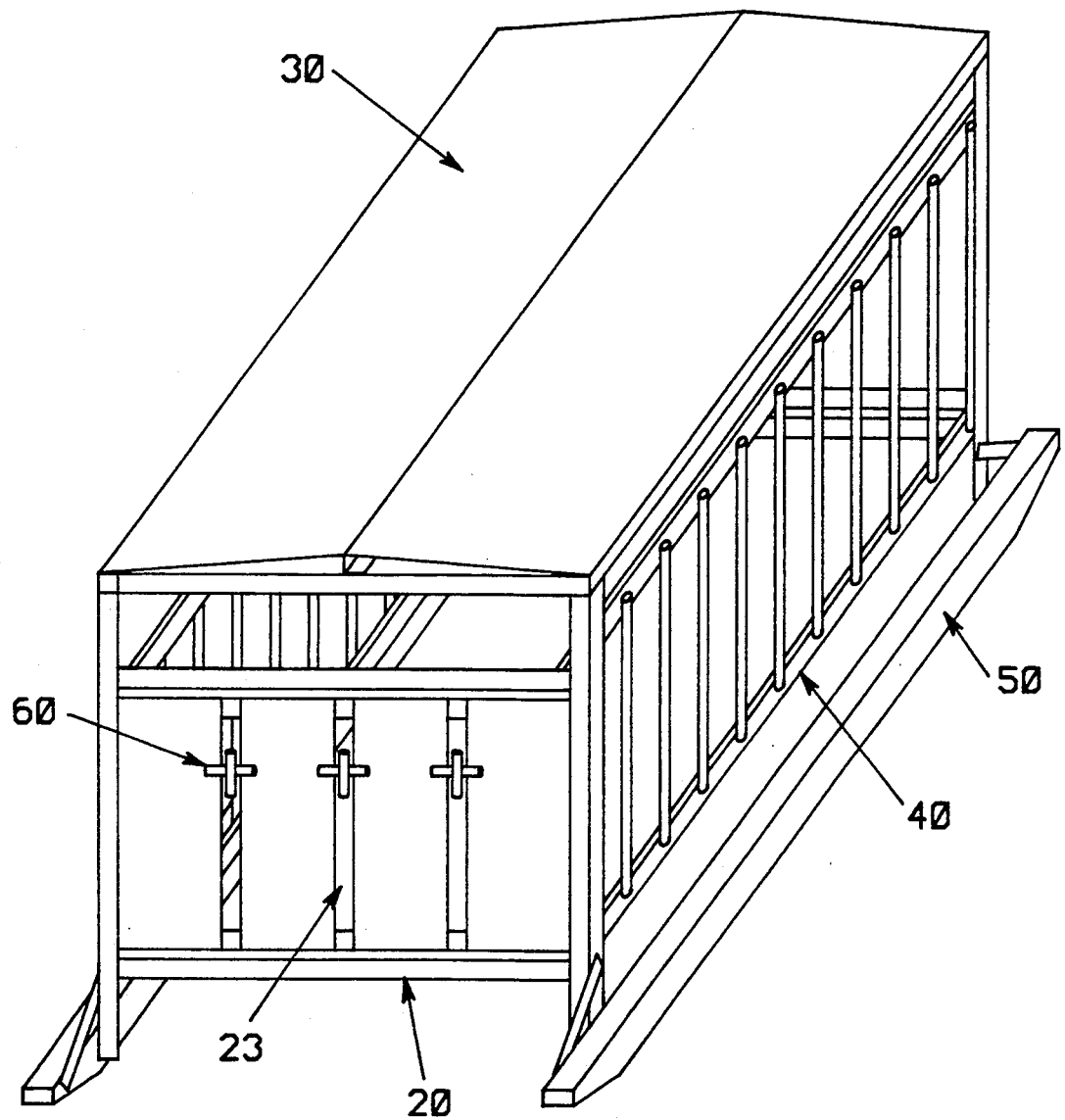
FIG. 1—an overall view of the invention with the major components indicated.

Referring to the drawings, we show the overall device in FIG. 1 and have indicated the main components (20,30,40,50, and 60) which when fastened together form the boxlike structure and the feeding mechanism. The structure is comprised of 5 distinct elements: "end walls" (20), "roof section" (30), "removable, adjustable gates" (40), "skids or framing members" (50), and optional "hay holder rods" (60). To construct a unit as shown, two of each are required except for the roof (30) of which only one is required.

The structure is formed by connecting the bottom corners of two opposing end walls (20) with framing members which in this embodiment are skids (50). The end walls support and are tied together at the top by the roof section (30). These end walls (20 in FIG. 4) are attached removably to both the roof (30) and the skids (50) thereby providing the means to easily assemble and disassemble the structure. The remaining two sides are comprised of the removable, adjustable gates (40)—see FIG. 2—which slide between the end walls (20) in channel guides (21) built into the end walls. In this preferred embodiment each channel guide is constructed by attaching two parallel angle irons (22) horizontally to the inside of the end walls as shown in FIG. 3.

In FIG. 1, optional hay holder rods (60) are shown inserted through the openings (23) in the end walls (20). These rods (60) are inserted into and support the hay inside the structure to prevent the hay stacked inside from tipping over, as the animals may reach through and attempt to pull the hay towards gates (40). These hay holder rods (60), as shown in FIGS. 13 and 14, are comprised of a long rod (61) with two shorter rods (62) welded at a 90 angle on the end of the long rod. These short rods prevent the longer rod from being pulled through the slot (23) of the end wall (20).

In this preferred embodiment the end walls (20), shown again in FIG. 5, are comprised of a rectangular outer framework (24) made of angle iron of the appropriate size. Angle braces (25) are shown in FIG. 6 attached to the bottom corners of framework (24) for added stability when attached to the bottom framing members (50). Also attached horizontally to the inside surface of framework (24) of the end walls are angle irons (22) which form top and bottom channel guides. Said channel guides support and are guides for the ends of the gates (40). These channel guides also contain a multiplicity of adjustment holes as shown in FIG. 7 in which pins or bolts may be inserted to hold the ends of the gates (40) from moving in or out. By locating the pins in different holes, the gates (40) may be positioned across the width of the feeder to control how much hay the animals can reach. This action allows the operator to ration the hay from the feeder. The end walls (20) may then be covered on the outside surface with sheet metal (26). This sheet metal contains slotted openings (23) through which the hay holder rods (60) may be inserted.

In FIGS. 8, 9, and 10 the roof section (30) is comprised of three angle irons (31,32,33) which form the eaves and peak support frame of the roof. To these angle irons we have attached five rafter members (34) of the appropriate size flat iron. On top of this framework is attached a sheet metal covering (35). This entire roof section may then be removably attached with bolts to the tops of the end walls (20).

In this preferred embodiment, adjustable, removable gates (40) are used to provide access to the hay; to control access to the hay; to allow easy loading of the structure without the need for heavy equipment or lifting; contain a method of reducing soreness on the animals; and allow for easy disassembly. These gates may be made by using top and bottom angle irons (41,42) in FIGS. 11 and 12. Between these angle irons (41,42) we have attached a series of vertical rods (43) spaced so that the livestock may insert its muzzle to reach for the hay. Rod spacing may be varied for different species of animals. Before attaching the rods (43) to the top and bottom angle irons (41,42), we have slipped a piece of pipe (44) over each rod (43). This pipe (44) has an inside diameter slightly larger than the outside diameter of the rod (43) and is shorter in length than the distance between the top (41) and bottom (42) angle irons. The pipe (44) is not fastened to the rod (43) or the angle irons (41,42). The pipe (44) is therefore free to rotate around the rod (43) reducing friction on the animal's muzzle as they push through the openings to reach the hay.

In this preferred embodiment we have used wooden skids (50) to form the bottom framing member that connects the bottoms of the opposing end walls (20). In FIG. 15 we show the general shape of these skids (50) and the location of bolt holes (51) for attaching the skids to the brace (25) and the bottom of the end walls (20).

In this preferred embodiment the hay/storage feeder can be assembled by attaching the end walls (20) to the skid plates (50) by bolting the 4 legs of the end walls to the skids. Three bolts are required on each leg.

The roof (30) is then put on by bolting the 4 corners of the roof section (30) to the tops of the 4 legs on the end sections (20).

The basic storage structure is then complete and ready for loading with hay.

After loading the storage area, the operator then inserts the ends of the adjustable, removable gates (40) into the channels (21) built into the end sections (20). One gate (40) is put in from each side. The gates are held in place by inserting a locking pin on each side of the end of each gate in each channel (21). 16 pins are required.

To load the structure the operator can remove one of the gate (40), and load the structure with hay by stacking bales inside the structure until the structure is full. Or if using large round bales, the structure is loaded by setting the large round bale on the ground parallel and next to one side and then rolling the bale into the structure.

After the structure is loaded, insert the adjustable gates (40) back into the channels (21) and lock in place by inserting locking pins in the appropriate holes in the channels.

The animals may then consume the hay by inserting their muzzles through the bars (44) of the adjustable gates (40).

When the animals can no longer reach hay through the gates, the gates can then be adjusted inward to allow them to again reach more hay. This adjustment is made by removing the locking pins in the channels, sliding the gates inward the desired amount, and then replacing the locking pins in the appropriate holes. This adjustment may be made as frequently as necessary to control consumption and waste.

To refill the device, the locking pins are removed and the adjustable gate (40) is removed from the feeder by sliding it out the ends of the channels. This opens up the side for easy refilling.

To relocate the device simply fasten a chain or rope to the skids (50) and tow the device to a new location.

We claim:

1. A combination livestock hat feeder and storage device comprising a partially enclosed box-like structure including upright opposing sidewalls and end walls joined to one another about their top and bottom corners, said end walls are constructed of an upper and lower framework positioned parallel to one another and on an interior surface of said end walls, one of said sidewalls is comprised of a gate releasably and movably supported about its corners in said framework of said end walls, wherein said framework is a channel which includes a means by which the position of said gate may be fixed in multiple locations across the width of said structure, further, said gate is constructed of a series of vertical bars and said bars are spaced such that an animal may reach the hay through the spacing between adjacent bars.

2. A combination hay feeding storage device as in claim 1 wherein the entire structure is covered with a roof that is supported and attached to the corners of said opposing end walls.

3. A combination hay feeding storage device as in claim 1 wherein the framework, end walls, and adjustable gates are detachably connected.

4. A combination hay feeding storage device as in claim 1 wherein the structure is mounted on skids for portability.

5. A combination hay feeding storage device as in claim 1 wherein one of said sidewalls may be removed to allow access at ground level to the interior of the structure.

6. A combination hay feeding storage device as in claim 1 wherein said end walls include a series of openings that allow a holding rod to be inserted to stabilize a stack of hay within the structure.

7. A combination hay feeding storage device as in claim 1 wherein said end walls comprise a series of vertical bars spaced such that an animal may reach through the spacings to the hay within the structure.

8. A combination hay feeding storage device as in claim 1 wherein said channel contain a plurality of holes in which pins may be inserted thereby providing the means by which the position of said gate may be fixed in multiple locations across the width of the structure.

9. A combination hay feeding storage device as in claim 1 wherein both of said sidewalls are releasably and movably supported about said opposing end walls, said sidewalls include a plurality of vertical bars, wherein each vertical bar includes a rotatably attached sleeve for reducing injury to a feeding animal.

* * * * *